United States Patent [19]

Fujii et al.

[11] Patent Number: 4,868,752
[45] Date of Patent: Sep. 19, 1989

[54] BOUNDARY DETECTING METHOD AND APPARATUS FOR AUTOMATIC WORKING VEHICLE

[75] Inventors: Yasuo Fujii, Sakai; Masahiko Hayashi, Toyonaka, both of Japan

[73] Assignee: Kubota Ltd., Osaka, Japan

[21] Appl. No.: 94,996

[22] Filed: Sep. 10, 1987

[30] Foreign Application Priority Data

Jul. 30, 1987 [JP] Japan .................................. 62-191321

[51] Int. Cl.⁴ ............................................. A01B 69/00
[52] U.S. Cl. ............................ 364/424.02; 364/424.07; 382/41
[58] Field of Search .............. 364/424, 424.02, 424.07; 382/41

[56] References Cited

U.S. PATENT DOCUMENTS 4,731,860  3/1988  Wahl ...................................... 382/41

FOREIGN PATENT DOCUMENTS 61-90215   5/1986  Japan .
61-139304  6/1986  Japan .

Primary Examiner—Andrew J. James
Assistant Examiner—David Soltz
Attorney, Agent, or Firm—Edwin E. Greigg

[57] ABSTRACT

A method and apparatus for use with an automatic working vehicle for detecting a boundary between a treated area and an untreated area. A predetermined range of working area including the treated area and the untreated area is photographed by a camera. Image data output from the camera is differentiated with respect to pixel to pixel brightness variations, which is then compared with a threshold value to produce edge image data on an X-Y plane showing, as binarized, a plurality of pixels regarded as representing a point of transition between the untreated area and the treated area, and other pixels. The boundary is calculated from the edge image data by means of HOUGH-transformation.

9 Claims, 11 Drawing Sheets

10---A/D CONVERTER
11---IMAGE MEMORY
12---IMAGE SWITCH
13---CONTROLLER
14---CONTROLLER
15---MONITOR
20---DIFFERENTIAL PROCESSOR
30---BINARIZER
40---HOUGH-TRANSFORMER
50---BOUNDARY PARAMETER OPERATOR
60---CONTROL

FIG. 10

| (x,y) | θ | ρ |
|---|---|---|
| (1,1) | 0 | |
| | 1 | |
| | 2 | |
| | ⋮ | |
| (1,2) | FF | |
| | 0 | |
| | 1 | |
| | 2 | |
| | ⋮ | |
| | FF | |
| (1,32) | 0 | |
| | 1 | |
| | 2 | |
| | ⋮ | |
| | FF | |
| (32,32) | 0 | |
| | 1 | |
| | 2 | |
| | ⋮ | |
| | FF | |

(a) Line detection from Prospective points (b) Mapping to ρ-θ plane (c) Section of max. meeting point of loci (d) Reverse mapping to x-y plane

BOUNDARY DETECTING METHOD AND APPARATUS FOR AUTOMATIC WORKING VEHICLE

BACKGROUND OF THE INVENTION

(1) Field of the Invention

The present invention relates to a boundary detecting method and apparatus for an automatic working vehicle, and more particularly to a method and apparatus for detecting a boundary between a treated area and an untreated area on the basis of image data provided by an image pickup device for photographing a predetermined range of working area forwardly of the vehicle.

(2) Description of the Prior Art

With the above-noted type of automatic working vehicle such as a lawn tractor or a combine harvester, areas surrounding a working range or area to be treated are manually processed as an already treated area in advance, and the vehicle is caused to treat the untreated area while automatically running along the boundary between the treated area and untreated area. A known method of detecting the boundary utilizes the phenomenon that, when the working is viewed obliquely from above, the untreated area looks dark because of uncut lawn growing therein whereas the treated area looks bright because of light reflected by cut lawn.

According to this method, a predetermined range of the working area forwardly of the moving vehicle is photographed and a variable-density image is produced from the photographed image according to its brightness. A transition point is identified in the variable density image where a dense portion changes into a light portion. A group of such transition points is regarded as representing the boundary along which the working vehicle is guided. However, the untreated area locally includes bright spots and similarly the treated area includes dark spots. These spots constitute noise and impede reliable detection of the boundary.

On the other hand, there is a method called HOUGH-transformation as disclosed in U.S. Pat. No. 3,069,654 which, when several points are distributed linearly, forms a straight line on the basis of these points (hereinafter referred to as prospective points). This method will be described briefly with reference to FIG. 13 of the accompanying drawings.

It is well known that, when a point (xi, yi) in the X-Y coordinate system is given, all the straight lines passing therethrough, regardless of the inclination, are expressed in the following equation:

$$\rho = x_i \cos\theta + Y_i \sin\theta$$

where $\rho$ is the length of a vertical line from the origin to the straight line, and $\theta$ is an angle formed between the vertical line and the X-axis (see FIG. 2(a)). If $\rho$ and $\theta$ are fixed to certain values, one straight line passing through the point (xi, yi) may be identified.

Since $\rho$ and $\theta$ are variables, all the straight lines passing through the point (xi, yi) describe one locus curve in $\rho$-$\theta$ plane as shown in FIG. 13(b). This locus is described as in FIG. 12(c) with respect to all prospective points in the X-Y coordinate system. One straight line may be identified by finding the point ($\rho_o$, $\theta_o$) where the curves representing the loci concentrate, as $$\rho_o = x_i \cos\theta_o + y_i \sin\theta_o.$$

The straight line segment sought is obtained by linking the points on the straight line expressed in the above equation through this operation.

There has been a great technical reluctance in employing this HOUGH-transformation method with the automatic working vehicle for boundary detection since a scattering range is increased unless prospective points are selected properly and a great amount of operation is required for transforming the X-Y plane into the $\rho$-$\theta$ plane.

SUMMARY OF THE INVENTION

The object of the present invention is to provide a boundary detecting method and apparatus for an automatic working vehicle, which employs the HOUGH-transformation method and which is reliable without imposing a great burden on an electronic control system.

In order to achieve this object, a boundary detecting method for an automatic working vehicle according to this invention comprises the steps of picking up an image of a working area in a predetermined range forwardly of the vehicle, converting data of the image picked up into data differentiated with respect to pixel to pixel brightness variations, comparing the differentiated data with a threshold value and producing edge image data on an X-Y plane showing, as binarized, a plurality of pixels regarded as representing a point of transition between an untreated area and a treated area and other pixels, and calculating a boundary between the untreated area and the treated area from the edge image data by means of HOUGH-transformation.

A boundary detecting apparatus for executing the above method comprises image pickup means for picking up an image of a working area in a predetermined range forwardly of the vehicle, differentiating means for converting image data received from the image pickup mean into data differentiated with respect to pixel to pixel brightness variations, binarizing means for comparing the differentiated data with a threshold value and producing edge image data on an X-Y plane showing, as binarized, a plurality of pixels regarded as representing a point of transition between an untreated area and a treated area and other pixels, and HOUGH-transformation means for receiving the edge image data and calculating a boundary between the untreated area and the treated area from the edge image data by means of HOUGH-transformation.

According to this construction, the selection of prospective points, which constitutes the starting point for calculating the boundary, is properly effected by the differentiating means and the binarizing means. This enables the HOUGH-transformation means to calculate the boundary reliably.

In a preferred embodiment of the invention, the HOUGH-transformation means includes a lookup table for storing a precalculated group of values of mapped coordinates [$\rho$, $\theta$] on a HOUGH-transformation plane associated with coordinates [x, y] on the X-Y plane of the edge image data, means for reading a series of mapped coordinate values in response to the edge image data, and counter means for counting frequencies with which the mapped coordinate values are read.

This construction is capable of HOUGH-transformation process at a very high speed, and permits its operating system to be simple.

This advantage will be doubled where the lookup table constitutes a ROM including addresses consisting of the coordinates [x, y] on the X-Y plane and one of the mapped coordinate values on the HOUGH-transformation plane associated with the coordinates [x, y], and data consisting of the other mapped coordinate values.

Other advantages of the present invention will be apparent from the description of the preferred embodiment to follow.

BRIEF DESCRIPTION OF THE DRAWINGS

FIG. 10 is an explanatory view of a lookup table storing HOUGH-transformation data.

DESCRIPTION OF THE PREFERRED EMBODIMENTS

Embodiments of the present invention will be described hereinafter with reference to the drawings.

Figure 1:
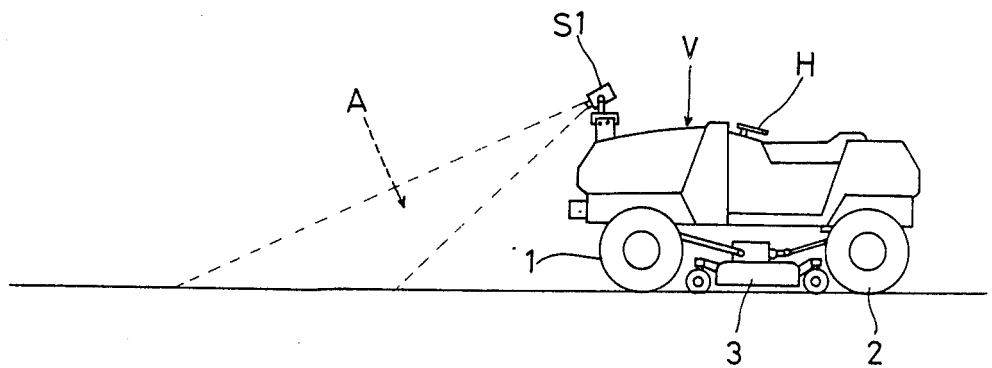
FIG. 1 is a side elevation of an automatic working vehicle equipped with a boundary detecting apparatus according to the present invention.

As shown in FIG. 1, a working vehicle V comprises a pair of right and left front wheels 1 and a pair of right and left rear wheels 2 supporting a vehicle body, and a grass cutting unit 3 vertically movably suspended from the vehicle body for cutting lawn, weed and the like.

The vehicle V carries an image sensor S1 at a front portion thereof to look down over a working area forwardly of the vehicle V. The image sensor S1 acts as image pickup means for photographing the working area forwardly of the vehicle over two-dimensional directions.

Figure 2:
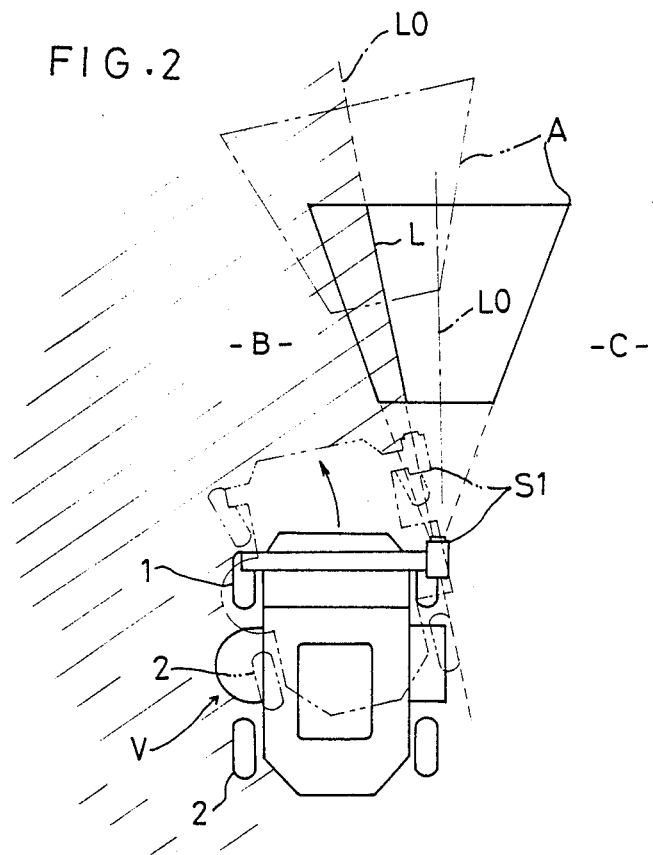
FIG. 2 is an explanatory view of a photographic field of vision of image pickup means included in the working vehicle.

The image sensor S1 has a photographic field of vision as shown in FIG. 2. To be particular, when the vehicle V moves properly along a boundary L between an untreated part B of the working area and a treated part C, the field of vision A of image sensor S1 includes the boundary located at a mid-position transversely thereof (referenced L0 in FIG. 2)

Figure 3:
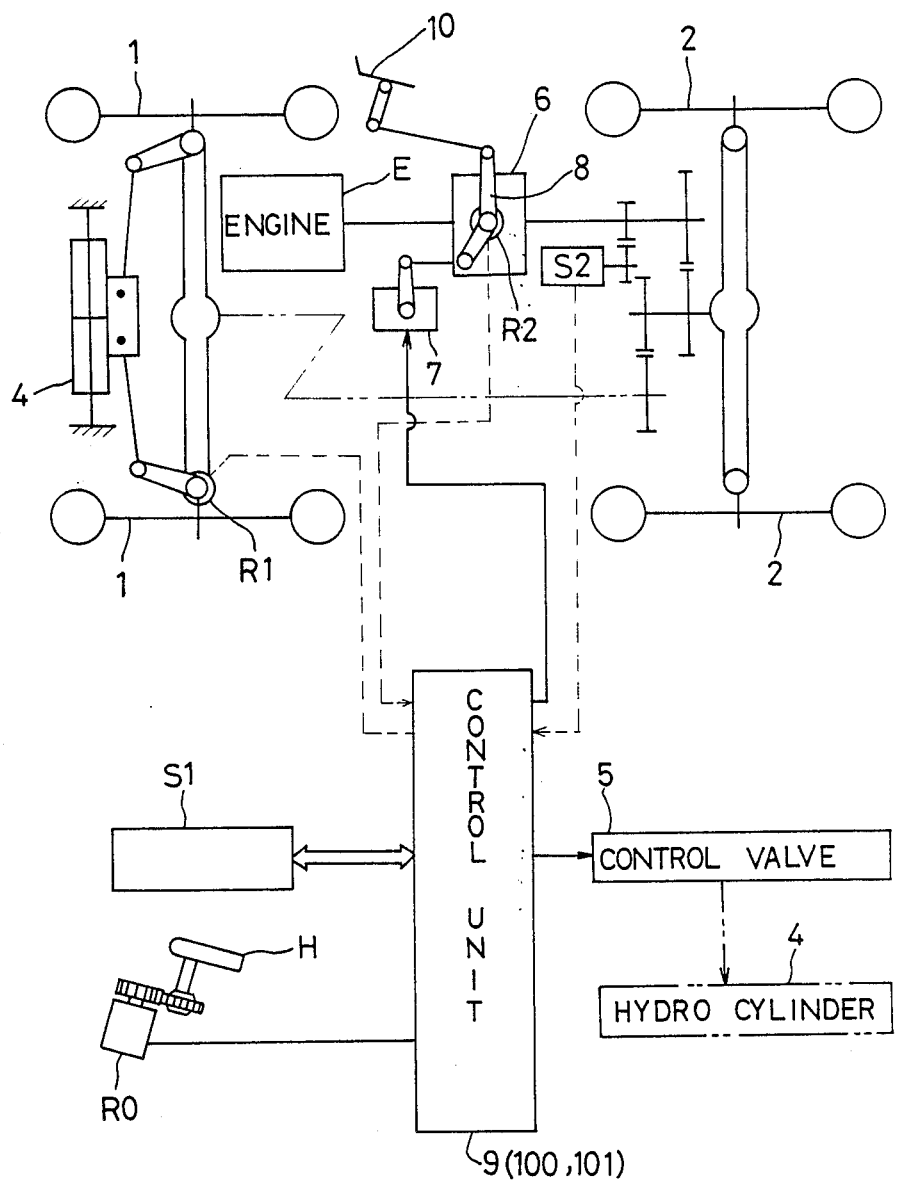
FIG. 3 is a block diagram showing a control system of the working vehicle.

Referring to FIG. 3, the working vehicle V further comprises a steering hydraulic cylinder 4 for controlling the front wheels 1, a control valve 5 associated with the cylinder 4, a hydraulic stepless transmission 6 operatively connected to an engine E, and a change speed motor 7 operatively connected to a change speed arm 8 of the transmission 6. The transmission 6 is operatively connected to the front wheels 1 as well as the rear wheels 2. Thus, the working vehicle V is the four wheel drive type.

A revolution sensor S2 is provided which is driven by the transmission 6 and outputs a pulse signal including a predetermined number of pulses corresponding to a unit frequency of revolution. The pulse signal forms the basis for detecting a running distance of the vehicle V.

The vehicle V also includes a potentiometer R1 for detecting steering angles of the front wheels 1, and a potentiometer R2 for detecting operative states of the transmission 6 thereby to indirectly detect running speeds of the vehicle V. Detection data are output from these potentiometers R1 and R2 to a control unit 9 comprising a microcomputer. The control unit 9 includes a steering control device 101 for causing the vehicle V to automatically run along the boundary L on the basis of these detection data, boundary position data produced by a boundary detecting device 100 from image data provided by the image sensor S1, running distance data provided by the revolution sensor S2, and various predetermined running control data.

The boundary detecting device which produces the boundary position data by processing the image data provided by the image sensor S1 forms part of the control unit 9.

In FIG. 3, reference H indicates a steering handle, reference R0 indicates a potentiometer for detecting positions of the steering handle H, and reference 9' indicates a change speed pedal.

Figure 4A:
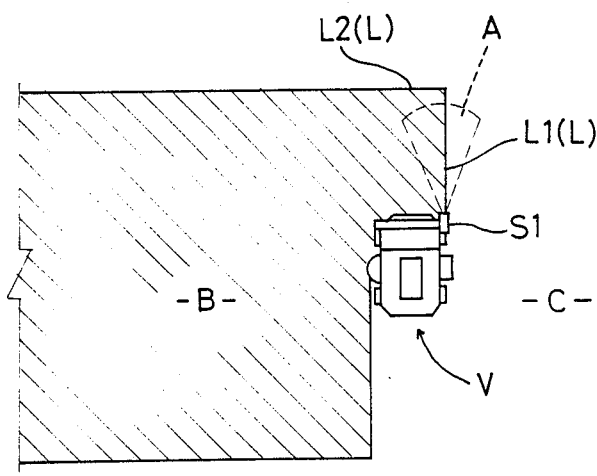
FIG. 4A is an explanatory view of a relationship between the working vehicle and a working area.

Reference is now made to FIG. 4A illustrating the automatic running of the vehicle V. A square untreated area B is shown surrounded by a treated area C, and one working track corresponds to a distance from one side of the treated area B to the opposite side thereof. The vehicle V is controlled on the basis of the data produced by the boundary detection device 100 to automatically run along a boundary L1 between the untreated area B and the treated area C extending longitudinally of the working track. When the vehicle V reaches a boundary L2 at the end of the working track, namely the opposite side of the untreated area B, the vehicle V is controlled to automatically make a turn toward the starting point of a next working track which crosses the working track just finished. These movements are repeated to automatically carry out a grass cutting operation over a selected area.

Figure 5:
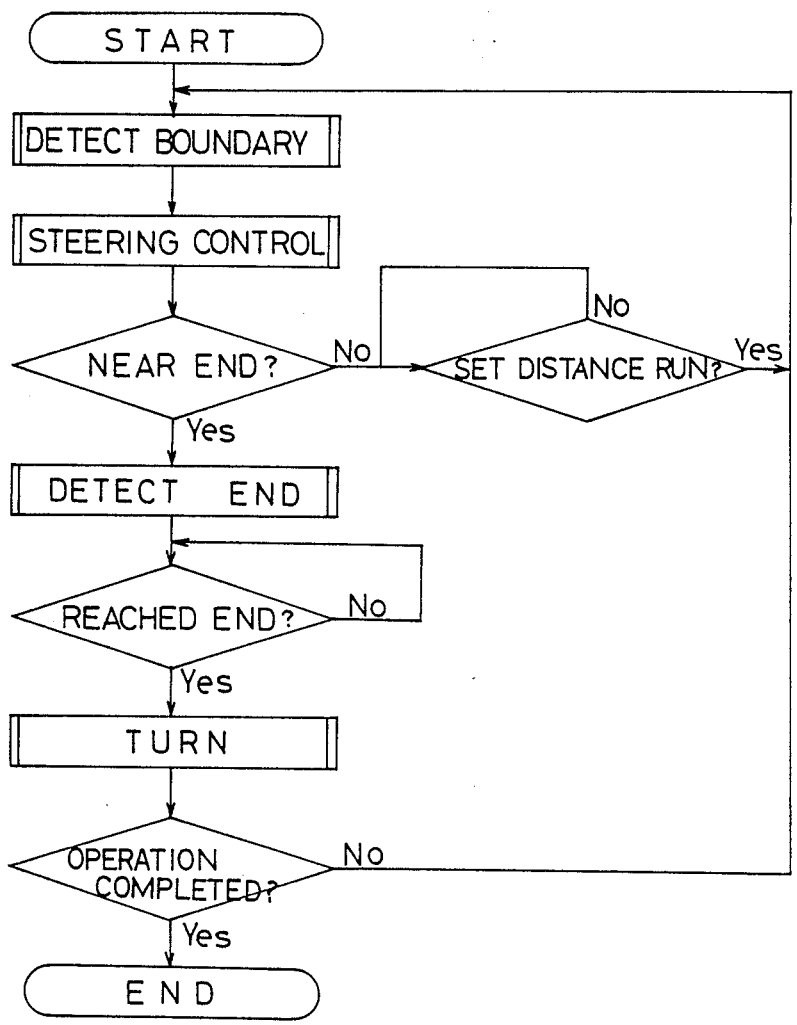
FIG. 5 is a flowchart of working vehicle controls.

FIG. 5 shows a flowchart of the control sequence for the above operation. When the vehicle V is started, the image data output from the image sensor S1 is processed every predetermined running distance in response to the detection data provided by the revolution sensor S2. The vehicle V is controlled to automatically run along the boundaries according to the boundary position data derived from the image data.

In the steering control according to the boundary position data, which will be described in detail later, the vehicle V is controlled such that the boundary L is tracked by the mid-position transversely of the field of vision of the image sensor S1, for example, one point on the centerline L0.

Subsequently, a detecting operation which will be described later is carried out for detecting the boundary L2 at the terminal end of the running track, which boundary extends perpendicular to the boundary L1, on the basis of the detection data provided by the revolution sensor S2 when the vehicle V runs into a predetermined range in the distance corresponding to one working track. The end position with respect to the current position of the vehicle V is derived from the position of the boundary L2 in the image. When the vehicle V reaches the position thus derived, the vehicle is controlled according to a predetermined turn pattern stored in the control unit 9 to make a turn for the next working track.

After the vehicle V makes the turn, judgment is made as to whether or not a predetermined number of tracks is completed or whether or not the vehicle V has run a predetermined distance. If the result is in the negative, the steps following the boundary detection are repeated. If the result is in the affirmative, the grass cutting operation is judged to have been completed and the program ends after stopping the vehicle V.

Figure 6:
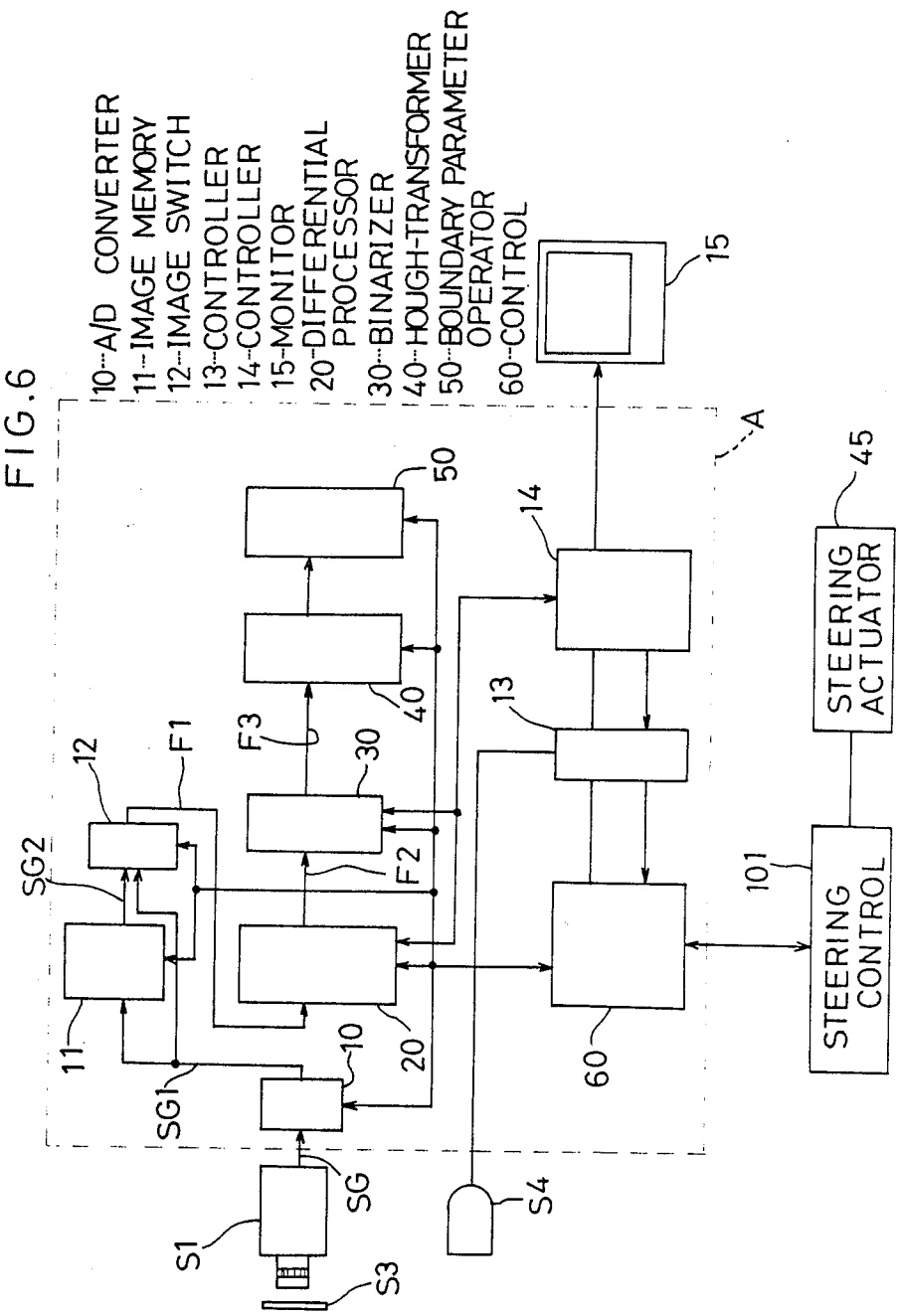
FIG. 6 is a block diagram of a boundary detecting device.

The construction and operation of the boundary detecting device 100 will now be described with reference to FIG. 6. The boundary detecting device 100 comprises an A/D converter 10, an image memory 11, an image switch 12, a differential processor 20, a binarizer 30, a HOUGH transformer 40, a boundary parameter operator 50, a control section 60, an ITV controller 13, and a CRT controller 14. These components are interconnected by address buses, data buses and control lines.

The A/D converter 10 digitalizes image data SG output from a camera constituting the image sensor S1, by quantitizing the data with 8-bit resolution. The image memory 11 stores the digitalized image data as a sample by turning its X-Y plane coordinates (x, y) 90 degrees into 32 by 32 pixel image data. The image switch 12, which acts as input mode switch means, selects for processing either the image data SG2 stored in the image memory 11 or image data SG1 output from the A/D converter 10 (which is processed as 32 by 32 pixel image).

The differential processor 20 differentiates an image signal F1 output from the switch 12 in accordance with variations in brightness transversely of the vehicle (along the axis of x coordinates), and converts the signal into edge image data F2 reflecting the direction and degree of the brightness variations. The binarizer 30 receives the edge image data F2 from the differential processor 20, and compares part of the edge image data F2 having either the positive sign or the negative sign with a predetermined threshold value Fref. Thus, the data is binarized, for example, "1" for those exceeding the threshold value and "0" for those not exceeding the threshold value, in accordance with the degree of brightness difference, thereby selecting image parts having great variations in brightness.

Figure 4B:
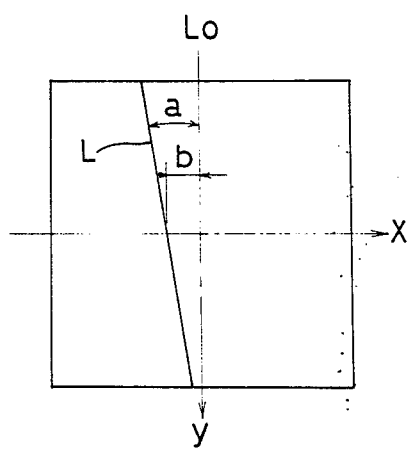
FIG. 4B is an explanatory view of boundary detection.

The HOUGH transformer 40 receives binarized image data F3 from the binarizer 30, approximates the data into a continuous straight line, and identifies the boundaries L1 and L2 on the image. The boundary parameter operator 50 determines $(\rho, \theta)$ from the data received from the HOUGH transformer 40, and produces the following equation (i) which is approximated based on the data received as a straight line representing a positional relationship of the detected boundaries L1 and L2 with respect to the center of the photographic field of vision A:

$$y = ax + b \qquad (i)$$

where a is an inclination of the boundary L in the image coordinate system with respect to the reference line L0, b is a transverse deviation of the boundary L in the image coordinate system with respect to the reference line L0, x represents coordinates of pixels in the transverse direction of the vehicle V, and y represents coordinates of pixels in the longitudinal direction of the vehicle V (see FIG. 4B).

The control section 60 controls the foregoing components of the boundary detecting device 100.

The ITV controller 13 controls the light emission of strobe 9 and the image pickup of camera S1. The CRT controller 14 controls the operation of a monitor television 15 for displaying the images processed at the differential processor 20 and the binarizer 30.

Figure 7:
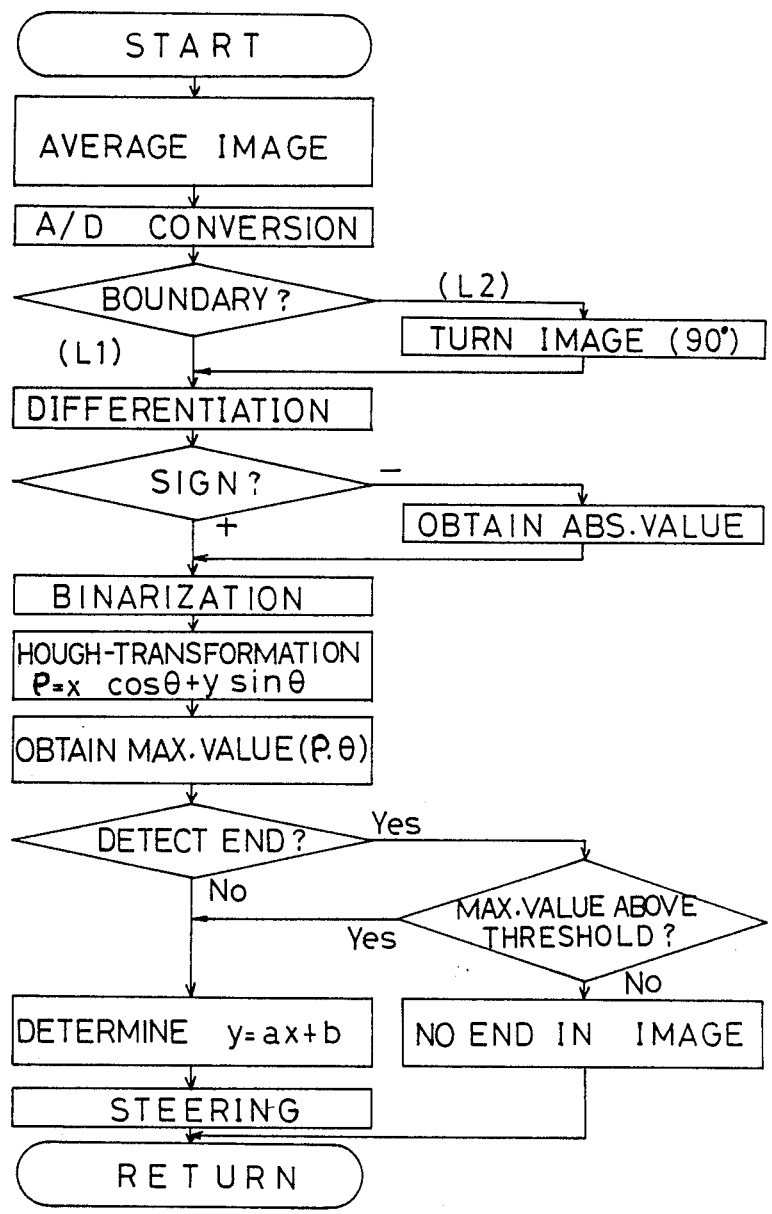
FIG. 7 is a flowchart of an overall operation of the boundary detecting device.

An overall boundary detecting operation will be described hereinafter with reference to the flowchart shown in FIG. 7. First, an entire image is picked up by the camera, which is averaged by a shading filter S3 mounted on a front face of the camera. The image is then subjected to A/D conversion to change into the digitalized image signal F1 having the 32 by 32 pixel orthogonal coordinate system per screen. The pickup image is shaded because the image picked up by the camera S1 is binarized according to a difference in brightness between adjacent pixels and it is necessary to eliminate local brightness variations and average the image. For this purpose, a soft focus filter S3 is mounted on the front face of the camera S1 to shade the pickup image.

Thereafter, checking is made as to whether the boundary L1 parallel to the track is detected or whether the boundary L2 at the end of the track is detected. As shown in FIG. 4A, the boundary L2 is perpendicular to the boundary L1. When the boundary L2 at the end of the track is detected, address coordinates of the image memory 11 are turned 90 degrees and the image signal SG2 read out in this state is used. When the boundary L1 is detected while the vehicle is running the track, the image signal SG1 having the same coordinate system as the original image signal SG is used. Thereafter, either of these image signals is differentiated by the differential processor 20, and only part of the signal having the positive differential sign or the negative differential sign is binarized by the binarizer 30 as described later.

Selection as to which part of the signal, the positive part or the negative part, should be binarized is made according to which side, right or left, of the vehicle V the untreated area lies, as described hereinafter. Take for example a working method wherein grass is cut by the vehicle running along peripheral sides of an area by making 90 degree leftward turns to gradually move inwardly of the area. In this case, the vehicle V runs with a treated area C located adjacent thereto at the righthand side. Thus, when the image is scanned from left to right, a positive brightness variation from dark to bright will occur distinctly across the boundary L1. Accordingly, after differentiating the variations between adjacent pixels, the variations having the positive sign (+) provide a guide for detecting the boundary L1 when the brightness variations are observed from the untreated area B to the treated area C. The variations having the negative differential sign (−) may be dismissed as noise.

Thereafter, the differentiated image data are selected and binarized according to the threshold value. The selected data are used for associated a group of straight lines extending through their coordinates in the orthogonal coordinate system or x-y plane with one locus in the HOUGH-transformation $\rho$-$\theta$ plane, according to the foregoing HOUGH-transformation principle, namely $$p = x \cdot \cos\theta + y \cdot \sin\theta \qquad \text{(ii)}$$

where $0° \leq \theta \leq 180°$, x is coordinates of pixels in the image data transversely of the vehicle, and y is coordinates of pixels in the image data longitudinally of the vehicle.

The locus mapped in the $\rho$-$\theta$ plane and corresponding to each image data, and consequently the group of HOUGH-transformation coordinate data $(\rho, \theta)$, is checked and the coordinates ($\rho, \theta$) through which the locus extends most is selected. According to the basic concept of this embodiment, HOUGH-transformation $\rho$-$\theta$ space is fragmented into pixels on a grid a frequency D with which the mapped locus passes each pixel, and then the HOUGH-transformation data ($\rho, \theta$) corresponding to the pixel of a maximum frequency Dmax is obtained.

The HOUGH-transformation data ($\rho, \theta$) showing the maximum value Dmax determined the foregoing equation (i) showing the boundary in the x-y plane. In equation (i), a is an inclination from the center of the photographic field of vision A and b is its deviation. On the basis of these two values and a current steering angle S of the front wheels 1 detected by the potentiometer R1, a target steering angle $\underline{S}$ is derived from the following equation (iii):

$$S\theta = Z1 \cdot S + Z2 \cdot a + Z3 \cdot b \qquad \text{(iii)}$$

where Z1, Z2 and Z3 are constants predetermined according to characteristics of the steering system.

The steering control device 101 is operable according to equation (iii) to steer the vehicle such that the boundary L is tracked by the transverse mid-position of the pickup image plane of the camera S1 acting as the image pickup means.

When the boundary L1 transversely of the vehicle is detected, the image data from the camera S1 is input directly to the differential processor 20. When the boundary L2 longitudinally of the vehicle is detected, the image data is stored in the image memory 11 with the vertical direction (Y) turned to the horizontal direction (X) and the horizontal direction (X) turned to the vertical direction (Y). By reading out the original X-Y plane coordinates (x, y) as they are, the coordinates (x, y) of the image data are input as turned 90 degrees to the differential processor 20. Therefore, the differential processor 20 and subsequent processing devices may be used as they are for detection of the boundaries L1 and L2 lying in the different directions with respect to the vehicle V.

In detecting the boundary L2 in the longitudinal direction of the vehicle, the vehicle V is judged not to have entered the vicinity of the boundary L2 at the end of the track when the maximum value Dmax concerning the HOUGH-transformation data ($\rho, \theta$) remains below the threshold value Fref. When the maximum value Dmax exceeds the threshold value Fref, a distance from the vehicle V to the boundary L2 at the end of the track is calculated from the inclination a and deviation b in the equation (i) and the distance between the lower end of the photographic field of vision and the front end of the vehicle V, thereby to accurately determine a turning point of the vehicle.

Figure 8:
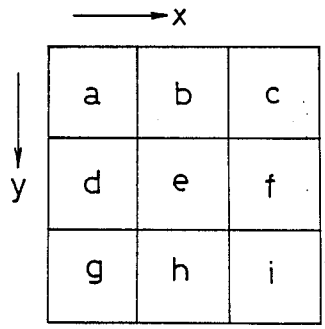
FIG. 8 is an explanatory view of a differentiating operation.

The operation of the boundary detecting device 100 will be described in detail hereinafter. First, the differential processor 20 differentiates a pixel in the X-Y plane by using a 3 by 3 pixel mask which, as shown in FIG. 8, covers nine pixels including pixel e to be processed and eight adjacent pixels a–d and f–i, and in accordance with the equation (iv) set out hereunder. This operation is carried out on all of the pixels to obtain defferential values of the brightness variations in the direction of X-axis on the image corresponding to the transverse direction of the vehicle.

$$SX(e) = (S(a) + 2 \times S(d) + S(g)) - (S(c) + 2 \times S(f) + S(i)) \qquad \text{(iv)}$$

wherein SX(e) is a differential value of pixel e, and S(*) is brightness of pixel *.

In this differentiation, the sign of the differential value SX is determined according to the position of the boundary L1, i.e. the right side or the left side of the vehicle V, and only the positive value or negative value is used. More particularly, in the above equation (iv), the brightness of a righthand pixel is subtracted from the brightness of a lefthand pixel. Thus, the differential value SX has a positive value when the lefthand pixel is brighter, and a negative value when the righthand pixel is brighter.

When the boundary L2 at the end is detected, the brightness variations occur conspicuously in the vertical direction on the image. Therefore, the subtraction is made between pixels arranged vertically.

Only the pixels whose absolute values exceed the predetermined threshold value are binarized. Thus, only the pixels showing great brightness variations are selected.

Figure 9:
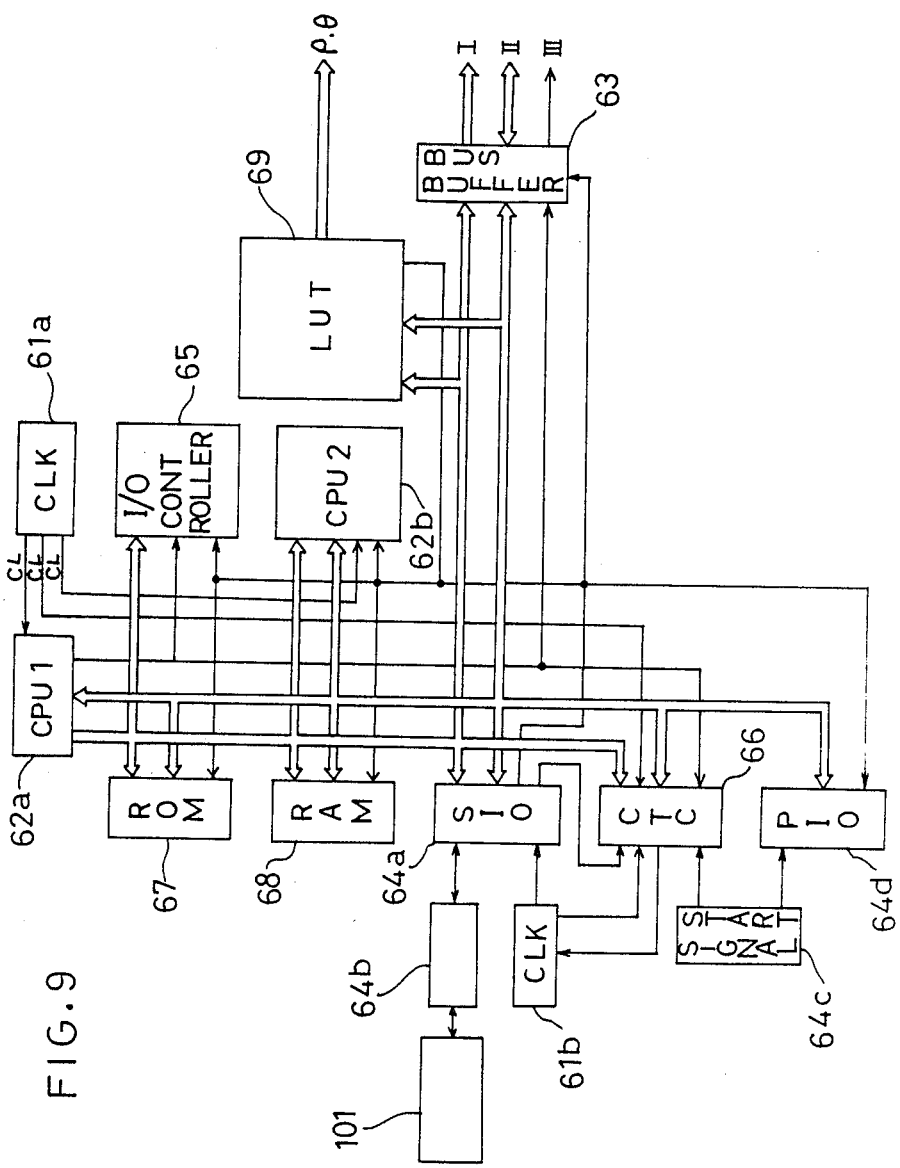
FIG. 9 is a block diagram of means for controlling the boundary detecting device.

The construction and operation of the control section 60 will be described next with reference to the block diagram shown in FIG. 9. The control section 60 comprises a clock generator 61a for generating a clock signal CL by which the entire operation is carried out in a synchronized manner. To be capable of high speed processing, the control section 60 also comprises a first CPU 62a acting as control processor for controlling various elements of the control section 60, and a second CPU 62b acting as processor for carrying out arithmetic operations. Results of operations of control signals and data are exchanged with other processing sections through a bus buffer 63. Similarly, data exchanges with the steering control device 101 is effected on-line through an SIO port 64a for serial interface and a communication interface 64b connected to the SIO port 64a. Further, the control section 60 is adapted to start the boundary detecting device A on-line through an on-line switch interface 64c and a PIO port 64d for parallel interface.

Data exchanges between the first CPU 62a and the second CPU 62b and the data exchanges through the bus buffer 63 are controlled by an input and output controller 65. The data exchanges through the ports 64a and 64b are also controlled by a control signal output thereto from the input and output controller 65 through a CTC controller 66. In FIG. 9, reference 61b indicates a clock signal generator for generating a clock signal for actuating the SIO port 64a and CTC controller 66. ROM 67 is a memory for storing the operating program of the boundary detecting device A. RAM 68 is a memory for temporarily storing data and for acting as buffer for operational data. LUT or lookup table 69 is a memory for storing operational data for use by the HOUGH-transformer 15 in high speed transformation of the coordinates (x, y) on the X-Y plane of each pixel in the image data into the HOUGH-transformation data ($\rho$, $\theta$) in the $\rho$-$\theta$ plane. That is to say, the HOUGH-transformation data ($\rho$, $\theta$) are stored in a table form to be obtainable directly from the coordinates (x, y).

The lookup table 69 stores the HOUGH-transformation data ($\rho$, $\theta$) corresponding to the coordinates (x, y) on the X-Y plane of the pixels. Here, $\theta(0° \leq \theta \leq 180°)$ is divided into 256 equal parts, and $\rho$ values corresponding to the respective parts $\theta 1$ to $\theta 256$ are calculated and stored in advance. More particularly, as shown in FIG. 10, the lookup table 69 stores the $\rho$ values corresponding to $\theta i$, to provide a group of HOUGH-transformation data for points on the X-Y plane. In other words, the lookup table 69 is a ROM storing the coordinates of pixels and $\theta i$ (i=1 ... 256) as addresses and $\rho$ values as the data.

Figure 11:
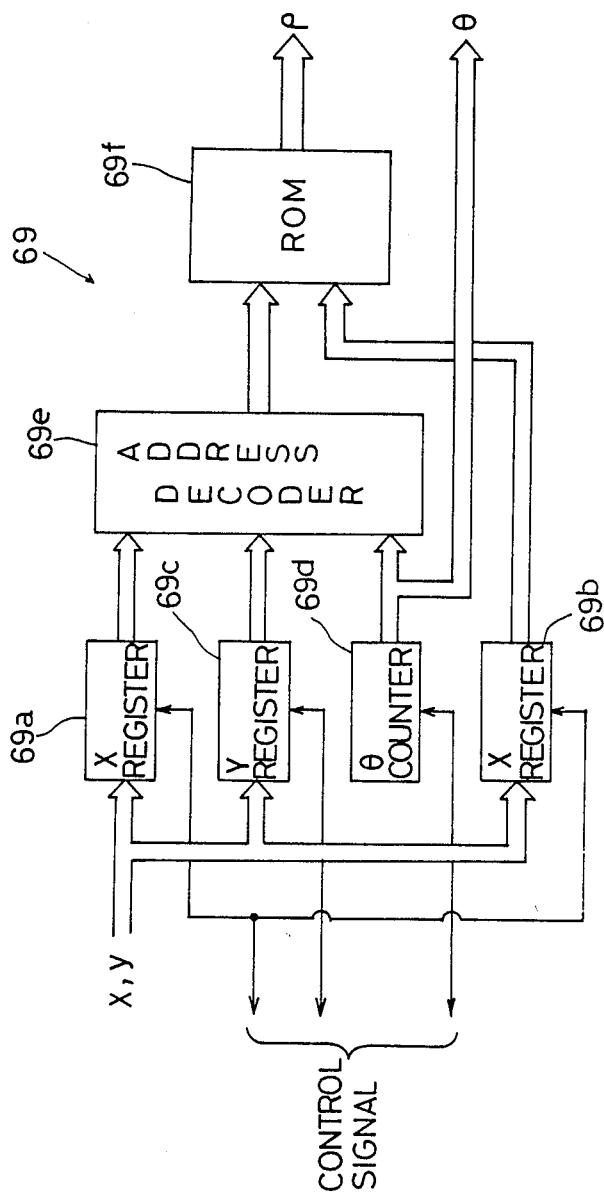
FIG. 11 is a block diagram of a HOUGH-transformation data memory.

As shown in FIG. 11, the lookup table 69 includes a pair of X-registers 69a and 69b and a Y-register 69c for producing address data to read out the $\rho$ value which is in one of the stored HOUGH-transformation data in accordance with the coordinates (x, y) of a given pixel, a $\theta$-counter 69d for producing 256 $\theta$ address data for each pixel, and an address decoder 69e for producing actual address data of a HOUGH-transformation data memory 69f storing the $\rho$ values in response to the address data produced by the registers 69a, 69b and 69c and the $\theta$ counter 69d. The lookup table 69 outputs directly to the HOUGH-transformer 40 the 256 HOUGH values for the coordinates (x, y) of each given pixel as the results of HOUGH-transformation along with the data of $\theta i$- (i=1 ... 256) produced by the $\theta$ counter.

Next, the constructions and operations of the binarizer 30 for binarizing the image data received from the differential processor 20, the HOUGH-transformer 40 and the boundary parameter operator 50 will be described with reference to the block diagram shown in FIG. 12.

An input and output controller 42 controls an overall operation to be carried out in response to the control signal input from the control section 60 through a bus buffer 41 and in synchronism with the operation of differential processor 20.

The edge image data F2 is input through a data buffer 43a to a comparator 31 of the binarizer 30, and is compared with the threshold value Fref input thereto through a buffer 32. Then the image data F2 is binarized, "1" for the part thereof having great brightness variations and "0" for the part having minor brightness variations. The resulting binarized image data F3 is input to a comparator 51 of the boundary parameter operator 50 through a data buffer 43b connected to a data bus BUS3, and stored in a binarized image data memory 33a.

In the HOUGH-transformer 40, the HOUGH-transformation values ($\rho$, $\theta$) received from the lookup table 69 through a data buffer 43c are counted by a frequency counter 44 acting as two-dimensional counter showing the $\rho$-$\theta$ plane. The count or frequency D is transmitted through a data buffer 43d and stored in a frequency memory 45 acting as two-dimensional memory. Further, $\rho$ and $\theta$ are identified by detecting a maximum value Dmax of the values stored in the memory 45, which is transferred to a maximum value register 52a of the boundary parameter operator 50 for comparison with a value stored in the maximum value register 52a. The greater of the two is re-stored in the maximum value register 52a as a new maximum value Dmax. The address in the frequency memory 45 for the frequency D corresponding to the maximum value Dmax is simultaneously stored in a maximum value address register 52b. After the HOUGH-transformation of all the 32 by 32 pixels, the straight line derived from the value of HOUGH-transformation data ($\rho$, $\theta$) of the maximum value Dmax is regarded as the boundary. This value also provides coefficients a and b in the equation (i).

Figure 12:
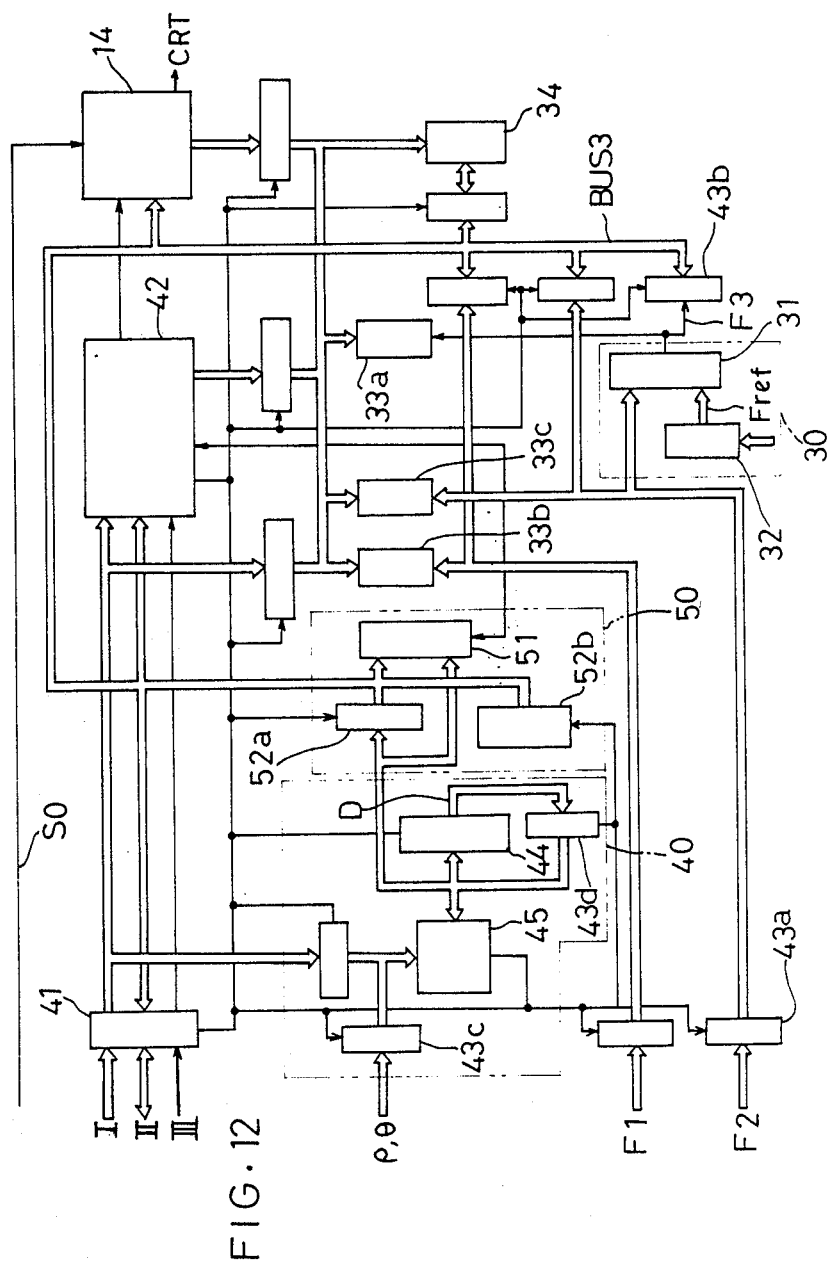
FIG. 12 is a block diagram of HOUGH-transformation means.
Figure 13:
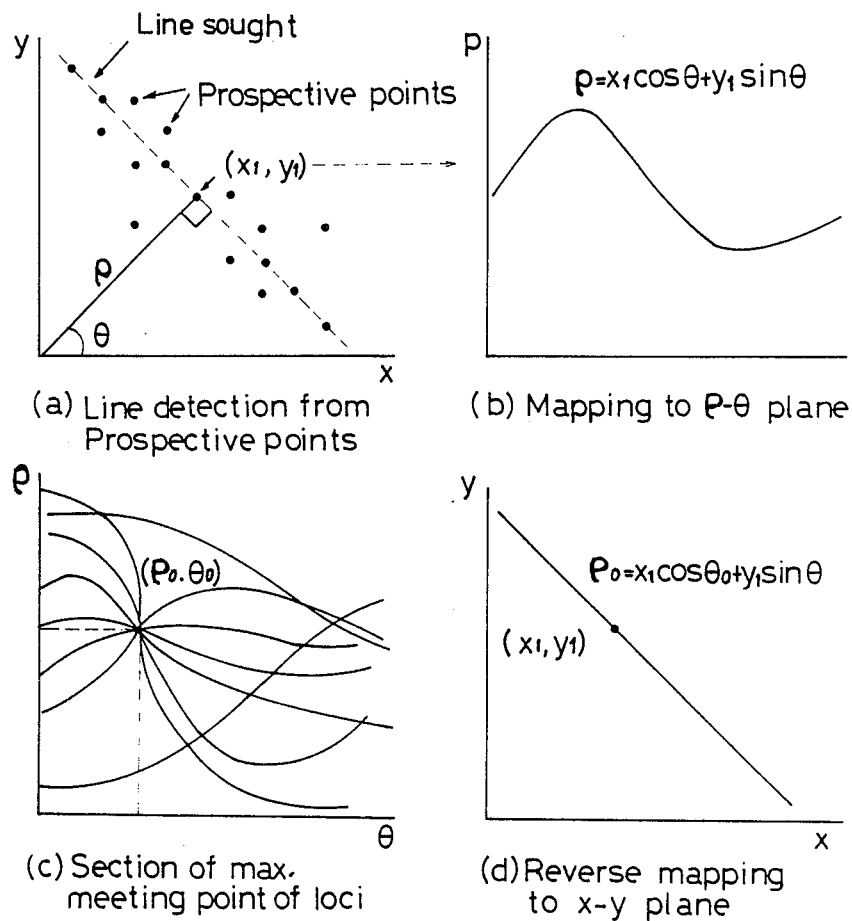
FIG. 13 is an explanatory view of a method of HOUGH-transformation.

In FIG. 12, reference 33b indicates an image memory for storing the digitalized image data F1. Reference 33c indicates an image memory for storing the edge image data F2. Images in various processing states are displayed on the monitor television 15 through a video RAM 34 and CRT controller 14.

In the foregoing embodiment, a selection is made between the image data whose coordinates are turned 90 degrees and the image data whose coordinates are not turned for input to the differential processor 20, according to whether to detect the boundary L2 longitudinally of the vehicle or not. The coordinates of the input image may be turned 90 degrees after every processing of image data for one screen, thereby to repeat alternations of the detection of the boundary L1 transversely of the vehicle V and the detection of the boundary L2 longitudinally of the vehicle V. In this case, with every field of the image picked up by the camera 3, the data whose coordinates are turned and the data whose coordinates are not turned may be input alternately. Then, the data necessary to each frame may be obtained simultaneously, and image data for detecting the different boundaries L1 and L2 may be obtained while the image is processed for one screen.

The vehicle V may comprise means for detecting running distance data. Then, the detected running distance data and data of intended running distance for one track run provide the basis for judging whether or not the vehicle has run to the vicinity of the end of the track, and for switching to the boundary L2 longitudinally of the vehicle V as appropriate.

In the foregoing embodiment, angular variations are processed between $0° \leq \theta \leq 180°$ according to the HOUGH-transformation equation (ii). The angular range for HOUGH-transformation may be limited to a smaller range than the range of zero to 180 degrees since the positional relationship between the vehicle V and the boundaries L1 and L2 is such that the directions of boundaries L1 and L2 do not greatly vary with respect to the direction in which the vehicle runs. The processing for a smaller range may achieve high precision, further increase the processing speed, and enable effective removal of influences of noise.

Further, in the foregoing embodiment the image data is sampled as 32 by 32 pixels. However, the number of pixels in a sample may be increased or decreased as necessary.

The reference line L0 extending vertically through the photographic field of vision is employed for determining the positional relationship between the vehicle V and the boundaries L1 and L2. However, the reference may comprise the lower end, upper end or center of the photographic field of vision, the origin of the coordinates of the image data, or other appropriate locations.

The described embodiment employs the two wheel steering mode wherein the vehicle is steered through the front wheels 1 only, but the vehicle may be steerable through the front wheels 1 and rear wheels 2. In this case, the inclination a may be corrected by employing a four wheel steering mode and turning the front and rear wheels in opposite directions to turn the vehicle, and the transverse deviation b may be corrected by employing a parallel steering mode in which the front and rear wheels are turned in the same direction to cause a parallel movement of the vehicle. Furthermore, both the inclination a and the deviation b may be corrected simultaneously by steering the front and rear wheels to different angles. The specific constructions of the steering control device 101 and other components are variable in many ways according to the construction of the vehicle to which the present invention is applied.

The image pickup means S1 in the foregoing embodiment is attached to the vehicle with its photographing direction inclined downwardly. However, the image pickup means may have a photographing direction extending vertically or approximately vertically.

What is claimed is:

1. A boundary detecting method for an automatic working vehicle, comprising the steps of:
   picking up an image (SG) of a working area in a predetermined range forwardly of the vehicle and converting said image into digital data (F1);
   converting data (F1) of the image picked up into data (F2) differentiated with respect to pixel to pixel brightness variations;
   comparing the differentiated data (F2) with a threshold value to produce binarized edge image data (F3) on an X-Y plane showing, as binarized, a plurality of pixels regarded as representing a point of transition between an untreated area (B) and a treated area (C) and other pixels;
   providing a lookup table for precalculating and storing a group of HOUGH-transformation coordinate points [$\rho$, $\theta$] corresponding to a group of straight lines, said straight lines further corresponding to the number of dispersed points defined on the $\rho$-$\theta$ plane passing through each coordinate point [x, y] on the X-Y plane;
   calculating a boundary between the untreated area (B) and the treated area (C) from the binarized edge image data (F3) by means of HOUGH-transformation, a $\rho$-$\theta$ plane in HOUGH-transformation being dispersed to define points on a grid; and
   the step of calculating a boundary including the further steps of reading the group of HOUGH-transformation corresponding coordinate points in response to respective transition point coordinates in the edge image data from the lookup table, counting frequencies with which the points on the grid on the $\rho$-$\theta$ plane in the HOUGH-transformation are read, and scanning said frequencies and determining a maximum value of the frequencies so as to detect a straight line corresponding to the maximum read point, thereby determining a boundary.

2. A boundary detecting apparatus for an automatic working vehicle, comprising:
   image pickup means for detecting an image (SG) of a working area in a predetermined range forwardly of the vehicle;
   A/D converter means for converting said image (SG) into digital image data (F1);
   differentiating means for converting image data (F1) received from the image pickup means into image data (F2) differentiated with respect to pixel to pixel brightness variations;
   binarizing means for comparing the differentiated data (F2) with a threshold value and producing binarized edge image data (F3) on an X-Y plane showing, as binarized, a plurality of pixels regarded as representing a point of transition between an untreated area (B) and a treated area (C) and other pixels; and
   HOUGH-transformation means for receiving the edge image data (F3) and calculating a boundary between the untreated area (B) and the treated area (C) from the edge image data (F3) by means of HOUGH-transformation, the HOUGH-transformation means including:
   a lookup table for dispersing a $\rho$-$\theta$ plane in HOUGH-transformation, defining points on a grid and precalculating and storing a group of HOUGH-transformation coordinate points [$\rho$, $\theta$] corresponding to a group of straight lines which further correspond to the number of the dispersed $\theta$ on the $\rho$-$\theta$ plane passing through each coordinate [x, y] on the X-Y plane;
   means for reading the group of HOUGH-transformation corresponding coordinate points in response to the respective transition point coordinates in the edge image data from the lookup table;
   means for counting frequencies with which the points on the grid on the $\rho$-$\theta$ plane in the HOUGH-transformation are read; and
   means for scanning and determining a maximum value of the frequencies so as to detect a straight line corresponding to the maximum read point and determine a boundary.

3. A boundary detecting apparatus as claimed in claim 2 wherein the lookup table constitutes a ROM including addresses consisting of the coordinates of points [x, y] on the X-Y plane and one of the mapped coordinate values on the HOUGH-transformation plane associated with the respective coordinates [x, y] and data consisting of the other mapped coordinate value.

4. A boundary detecting apparatus as claimed in claim 2, further comprising:
   coordinate turning means disposed at an input end of the A/D converter means for rotating by 90 degrees the coordinates of the image data (SG) received from the image pickup means and for selectively outputting results to the differentiating means; and
   image switching means for selectively receiving the image data (SG) transmitted from the image pickup means bypassing the memory means and for directly transmitting the digital image data (F1) to the differentiating means.

5. A boundary detecting apparatus as claimed in claim 2, wherein the means for reading the group of the HOUGH-transformation corresponding coordinate points [$\rho$, $\eta$] from the lookup table and counting frequencies with which the points in the grid on the $\rho$-$\theta$ plane in the HOUGH-transformation are read is adapted to select from points within a narrow scope of zero to 180 degrees which does not substantially vary from a forward direction of the vehicle (V).

6. An automatic working vehicle having a boundary detecting apparatus, comprising:
   steerable wheels;
   steering control means for controlling the steerable wheels to cause the working vehicle to automatically run along a boundary between an untreated area (B) and a treated area (C); and boundary detecting means for detecting said boundary, said boundary detecting means including:

image pickup means for detecting an image of a working area in a predetermined range forwardly of the vehicle;

A/D converter means for converting said detected image to digital image data (F1);

differentiating means for converting image data (F1) received from the image pickup means into data (F2) differentiated with respect to pixel to pixel brightness variations;

binarizing means for comparing the differentiated data (F2) with a threshold value and producing binarized edge image data (F3) on an X-Y plane showing, as binarized, a plurality of pixels regarded as representing a point of transition between the untreated area (B) and the treated area (C) and other pixels;

HOUGH-transformation means for receiving the edge image data (F3) and calculating the boundary between the untreated area (B) and the treated area (C) from the edge image data (F3) by means of HOUGH-transformation; and control means for outputting to the steering control means a control signal corresponding to the boundary calculated by the HOUGH-transformation means, wherein the HOUGH-transformation means includes:

a lookup table for dispersing a $\rho$-$\theta$ plane in HOUGH-transformation, defining points on a grid, and precalculating and storing a group of HOUGH-transformation coordinate points [$\rho$, $\theta$] corresponding to a group of straight lines which correspond to the number of the dispersed $\theta$ on the $\rho$-$\theta$ plane passing through each coordinate [x, y] on the X-Y plane;

means for counting frequencies with which the points on the grid on the $\rho$-$\theta$ plane in the HOUGH-transformation are read;

means for scanning and determining a maximum value of the frequencies so as to detect a straight line corresponding to the maximum read point and determine a boundary; and control means for sending a control signal corresponding to the boundary calculated by the HOUGH-transformation means to the steering control means.

7. An automatic working vehicle as claimed in claim 6, wherein the steering control means is operable to control the steerable wheels to follow the boundary determined by the HOUGH-transformation means to be represented by at least one position in a central region transversely of a photographic field of vision of the image pickup means.

8. An automatic working vehicle as claimed in claim 7, wherein the image pickup means is attached to the vehicle with a photographing direction thereof extending obliquely downward.

9. An automatic working vehicle as claimed in claim 8, wherein the image pickup means includes an optical filter for shading the photographic field of vision to a greater degree progressively toward a portion thereof corresponding to a rear end longitudinally of the vehicle.

* * * * *